United States Patent [19]

Moore et al.

[11] 3,990,659
[45] Nov. 9, 1976

[54] LOW COST ATTITUDE POSITION SENSOR FOR HIGH SPEED VEHICLES

[75] Inventors: Frankie Gale Moore, King George; John Lawrence Frierson; Richard Lawrence Van Meter, both of Fredericksburg, all of Va.

[73] Assignee: The United States of America as represented by the Secretary of the Navy, Washington, D.C.

[22] Filed: Aug. 27, 1975

[21] Appl. No.: 608,124

[52] U.S. Cl. .............................. 244/181; 244/175; 244/3.14; 244/3.21
[51] Int. Cl.² .................................... B64C 13/18
[58] Field of Search ............... 244/77 R, 77 D, 3.2, 244/3.14, 3.19, 3.15, 3.21, 17.13, 1 A, 175, 181, 176; 340/27 AT; 324/72

[56] References Cited
UNITED STATES PATENTS

| | | | |
|---|---|---|---|
| 3,283,241 | 11/1966 | Forbes | 324/72 |
| 3,317,826 | 5/1967 | Knop | 324/72 |
| 3,868,074 | 2/1975 | Hill | 340/27 AT X |

Primary Examiner—Trygve M. Blix
Assistant Examiner—Reinhard J. Eisenzopf

[57] ABSTRACT

A pair of electrostatic sensors are recessed in the outer wall of a supersonic ballistic body.

The vertical electrostatic gradient in the atmosphere produces a voltage differential between the sensors when one sensor is higher than the other. Since the fixed geometrical relationship between the sensors is known, the magnitude and sign of the voltage differential can be correlated to the instantaneous attitude of the vehicle with respect to the earth's surface.

2 Claims, 3 Drawing Figures

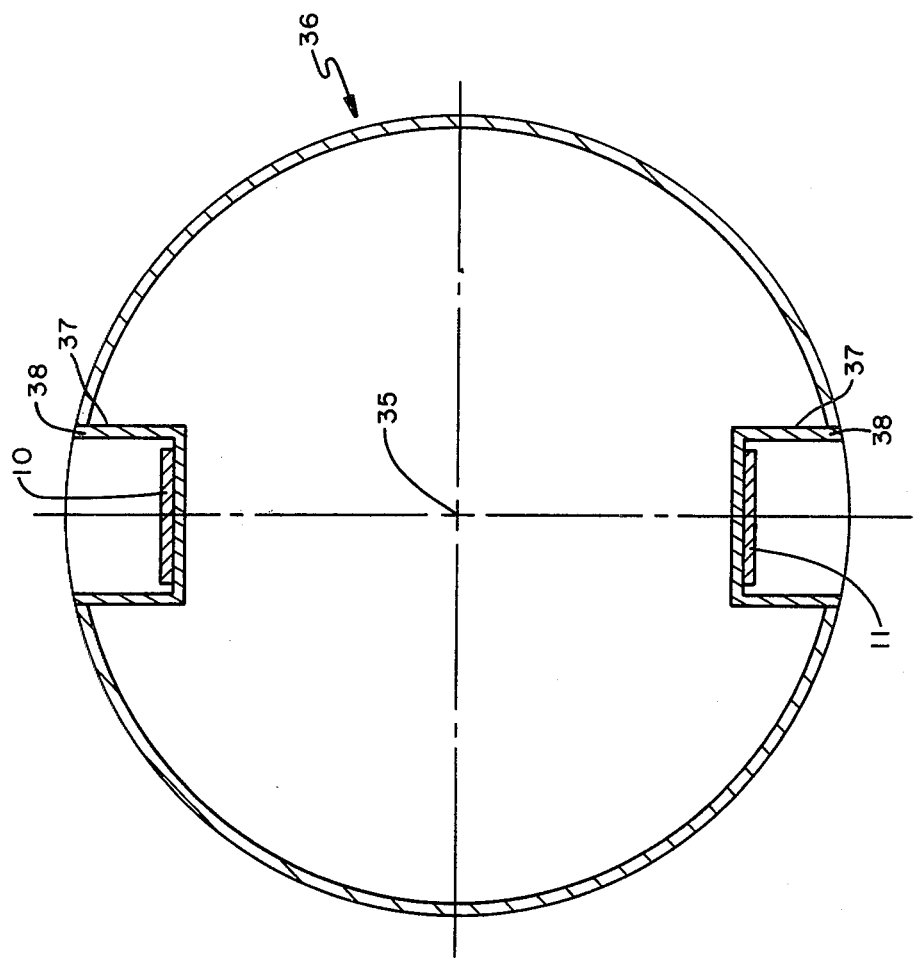

LOW COST ATTITUDE POSITION SENSOR FOR HIGH SPEED VEHICLES

BACKGROUND OF THE INVENTION

The Low Cost Attitude Position Sensor utilizes the earth's electrostatic field to determine the roll position of small, highly maneuverable missiles or guided projectiles moving at supersonic speeds.

Previous methods of measuring the roll of guided missiles and projectiles consist of using optical techniques such as sunlight, flares or lasers or of using mechanical methods such as vyros and gyros. The optical means of measuring roll obviously depends on a repeatable source of light intensity such as the sun. This, therefore, eliminates from testing those days when it is raining or there exists a heavy cloud cover, or at night.

The gyros and vyros are the usual methods utilized to determine roll because they are independent of weather conditions. However, they are quite expensive, require a fairly large volume, and as of yet are unreliable in a high-g (up to 15,000g's) environment. Moreover, in order to get roll position, an integration circuit is required which must have initial conditons. Also, a vehicle which rolls constantly over a given time period requires the accuracy of the mechanical system be very high in order to get accurate roll position towards the end of the flight. This in turn makes this system very expensive.

SUMMARY OF THE INVENTION

The earth's atmosphere contains an electrostatic field whose intensity is strongest (180 volts per meter average) at the earth's surface and decreases rapidly with altitude above 4,000 feet. In the presence of this vertical potential gradient, a sensor at a higher altitude will read a more positive voltage with respect to a similar sensor at a lower altitude. If a pair of electrostatic sensors are recessed in diametrically opposed cavities near the aft end of the ogive curvature of a missile, the vertical separation distance between the two sensors will change as the missile rolls during flight. The voltage differential between the two sensors will vary from positive to negative depending on which particular sensor is "up". The absolute value of the voltage differential should reach a maximum when the sensors are in the vertical plane and a minimum (zero) when the sensors are in the horizontal plane. Ideally, a rolling missile produces a sine wave output with time which can be converted to instantaneous roll position.

In a preferred embodiment, the automatic vehicle roll position indicator uses radioactive alpha emitters to ionize the atmosphere in the presence of the atmospheric electrostatic field gradient in the vicinity of the earth. These emitters are recessed in cavities that are located in the outer wall of the ballistic body. The cavities are positioned such that the boundary layer flow will yield the maximum voltage output of the emitters. FET operational amplifiers are used to amplify the resulting voltages from the emitters which are then supplied to an operational amplifier. The latter provides an output voltage representing the difference between the voltage output of two FET amplifiers. Radioactive alpha emitter sensors are used to provide roll information as a function of time for any roll position.

STATEMENT OF THE OBJECTS OF THE INVENTION

An object of the invention is to provide a simple, inexpensive, compact means to instantaneously measure high velocity vehicle roll position as a function of time.

Another object of the invention is to provide an apparatus which is reliable in a high-g environment.

An object of the invention is to provide no degradation in the accuracy of the electrostatic roll output data due to changes in Mach number, altitude or roll rate.

Other objects, advantages and novel features of the invention will become apparent from the following detailed description of the invention when considered in conjunction with the accompanying drawings.

BRIEF DESCRIPTION OF THE DRAWINGS

FIG. 3 is a cross sectional view of FIG. 2 along the line 3—3.

DESCRIPTION OF THE PREFERRED EMBODIMENT

Figure 1:
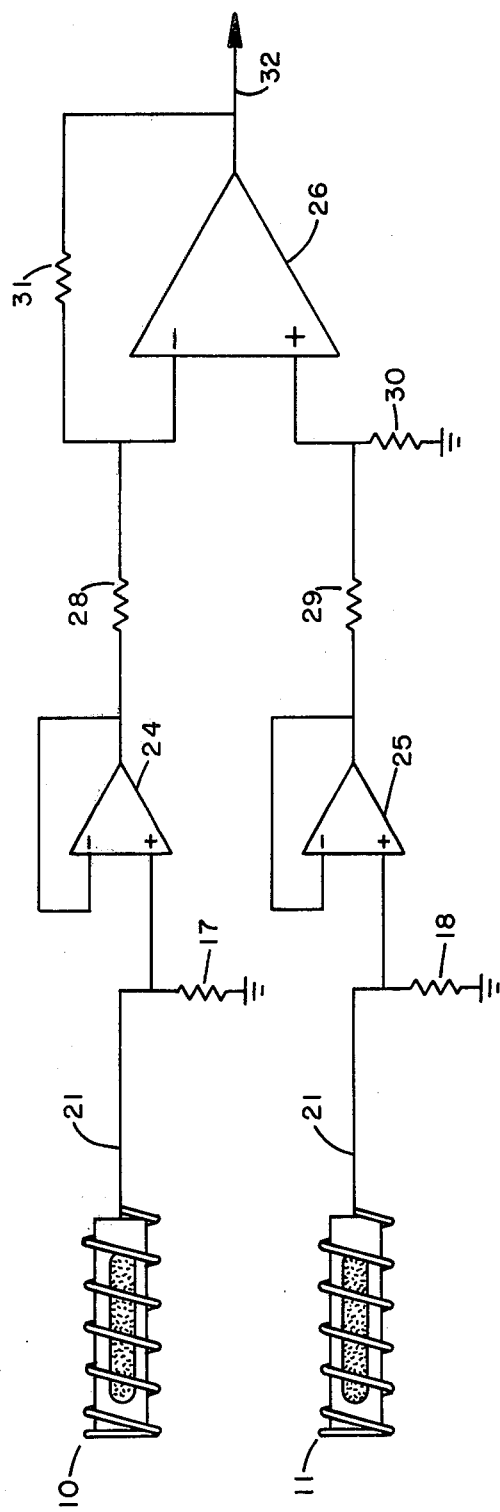
FIG. 1 is a detailed circuit diagram of the invention.

Referring to FIG. 1, radioactive alpha emitters 10 and 11 ionize atmospheric air molecules. The ionized molecules move in a vertical plane parallel to the atmospheric electrostatic field gradient. The collection of ionized molecules upon each emitter 10 and 11 cause the movement of electrons from ground through equal valued resistors 17 and 18, then through shielded cables 21, and into the emitters 10 and 11. The movement of electrons through resistors 17 and 18 cause a potential drop across the resistors 17 and 18. If the emitters 10 and 11 are vertically spaced, the potential across each resistor 17 and 18 is different. Likewise, if the emitters 10 and 11 are in a plane parallel to the earth's tangent plane, no potential drop results across resistors 17 and 18.

The emitters 10 and 11 are electrically joined to one of each of the positive inputs of the field effect transistor input operational amplifiers 24 and 25 by coaxial cables or other electrical connectors 21 to maintain a high insulation resistance in the emitter wiring to avoid leakage paths. The FET operational amplifiers 24 and 25 are unity gain high input impedance buffers. Amplifier 26 amplifies any voltage difference between the outputs of amplifiers 24 and 25 which is essentially, measuring the voltage difference between the output of emitters 10 and 11. The combination of resistors 28, 29, 30 and 31 define a gain function. When resistor 28 has the same value as resistor 29, and resistor 30 has the same value as resistor 31, the equation for gain function is: (value of resistor 31/value of resistor 28) [emitter 11 output-emitter 10 output].

The output 32 of the operational amplifier 26, relayed via a telemetry link, is a sinusoidal analog voltage representation for a 360° rotation of emitters 10 and 11 about the vehicle axis 35. (See FIG. 3)

Figure 2:
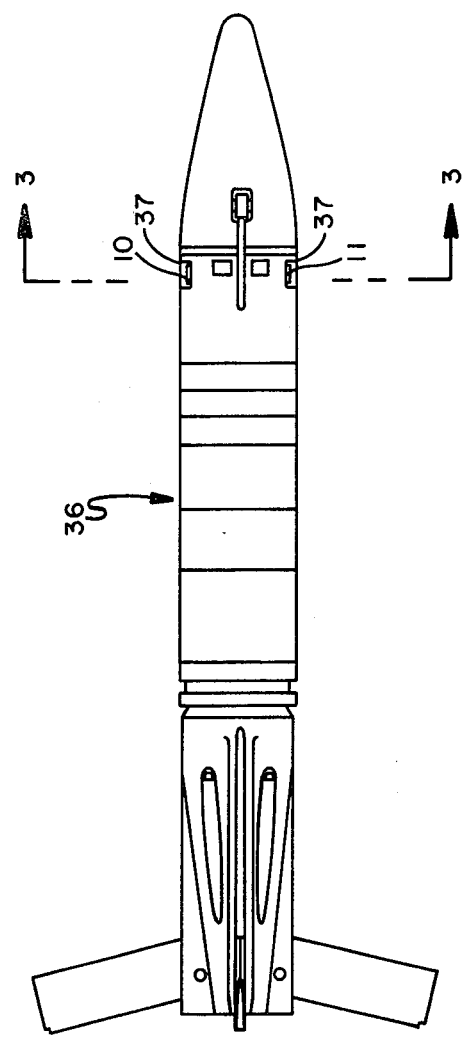
FIG. 2 is a schematic view of a projectile fitted with electrostatic sensors.

FIG. 2 shows the pair of emitters 10 and 11 each recessed in a cavity 37 in the body of a projectile shell 36. FIG. 3 shows a cross sectional view of the projectile cavities. A non-conductive material, 38 insulates the projectile from the emitters. A grill-like cover of teflon or plastic could cover the cavity, but should not interfere with the air flow desired. A hemispherical field of ionized particles hovers over each emitter. If an emitter is exposed to the supersonic free stream of air, the ionized cloud is blown away and the emitter fails to operate. If on the other extreme, an emitter is so located that there is no air sweep, the emitter becomes saturated. The emitters should be aerodynamically positioned on the ballistic body where the air flow yields the maximum voltage output of the emitters. The optimum air flow velocity seems to be around 20 meters per second. In the ballistic round shown in FIG. 2, the emitter signal is maximized when the emitters are placed near the aft end of the ogive curvature in recessed cavities.

Obviously many modifications and variations of the present invention are possible in the light of the above teachings. It is therefore to be understood that within the scope of the appended claims the invention may be practiced otherwise than as specifically described.

What is claimed is:

1. An apparatus operating in the electric field existing in the earth's atmosphere for instantaneously measuring the roll position of a supersonic ballistic body, comprising:
    a supersonic ballistic body, said body provided with a plurality of cavities circumferentially located aft of the ogive curvature of said body;
    at least two electrostatic sensors, each sensor recessed in one of said cavities and responsive to the atmospheric electrostatic field gradient;
    a first high input impedance unity gain FET operational amplifier wherein one of said sensors is connected to the positive input of said first amplifier;
    a second high input impedance unity gain FET operational amplifier wherein another of said sensors is connected to the positive input of said second amplifier;
    a differential amplifier connected to the outputs of said first and second operational amplifiers, whereby said differential amplifier amplifies the voltage difference between the outputs of said operational amplifiers and whereby the output of said differential amplifier is a sinusoidal analog voltage representation for a 360 degree rotation of said sensors about the projectile axis; and
    a telemetry link for relaying in real time said sinusoidal output of said differential amplifier to a receiving station.

2. The device of claim 1 wherein said electrostatic sensors are radioactive alpha emitters for ionizing air molecules, each emitter recessed in one of said cavities and each of said cavities is aerodynamically positioned in an area where the boundary layer flow will yield the maximum voltage output of said emitters.

* * * * *